G. E. TAFT.
Beater for Cotton-Pickers.

No. 164,948.  Patented June 29, 1875.

Witnesses: David R. Chase, Henry B. Osgood.

Gustavus E. Taft, Inventor.

THE GRAPHIC CO.PHOTO-LITH.39 & 41 PARK PLACE, N.Y.

UNITED STATES PATENT OFFICE.

GUSTAVUS E. TAFT, OF NORTHBRIDGE, MASSACHUSETTS.

IMPROVEMENT IN BEATERS FOR COTTON-PICKERS.

Specification forming part of Letters Patent No. 164,948, dated June 29, 1875; application filed February 13, 1875.

*To all whom it may concern:*

Be it known that I, GUSTAVUS E. TAFT, of Northbridge, Massachusetts, have invented a Picker-Beater, of which the following is a specification:

The object of my invention is to produce beaters for cotton openers and lappers that open and clean the cotton better, have more striking-surface, are less noisy and jarring, and are easier upon the bearings and belts than those heretofore in use.

Figure 2:
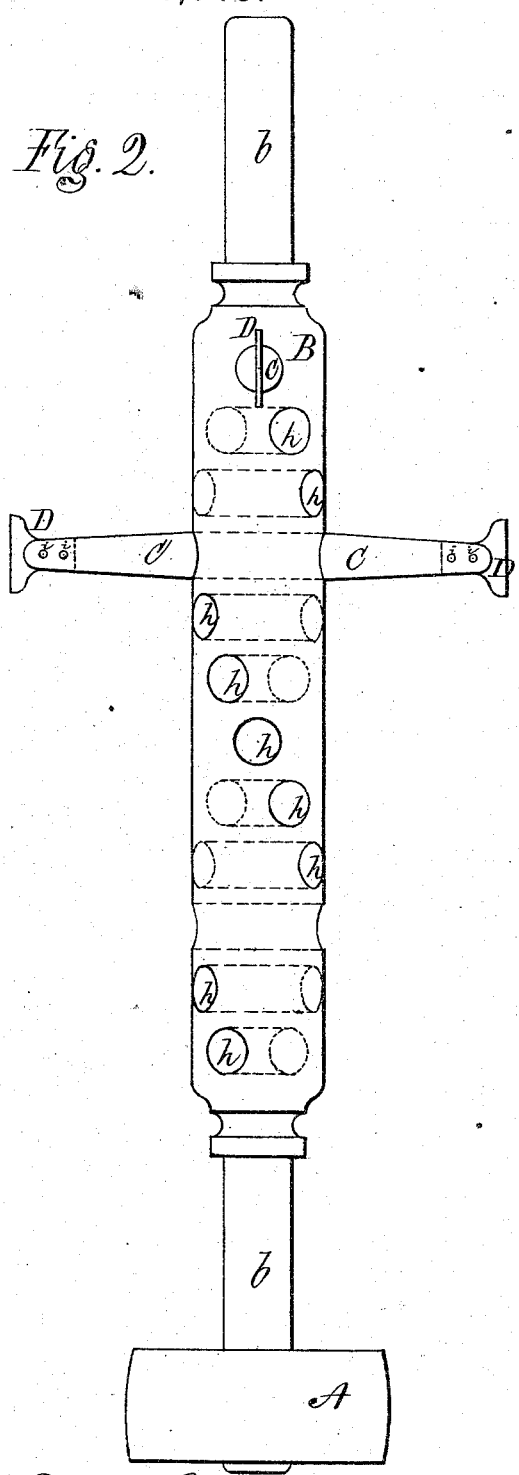
Figure 1:
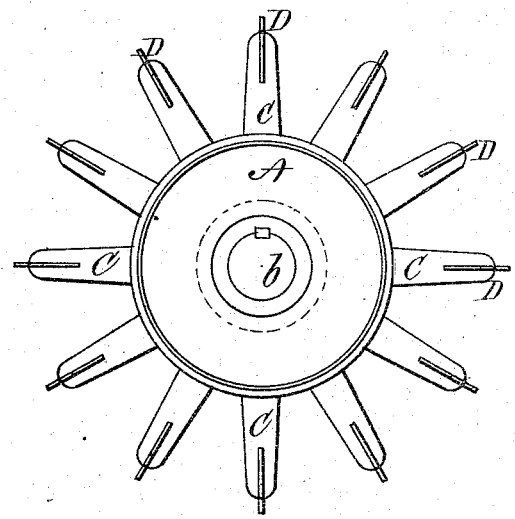
Figure 3:
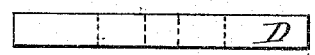
Figure 4:
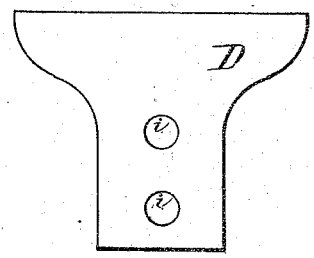

In the accompanying drawings, Figure 1 is an end elevation of a beater, showing the same with twenty-four arms and blades, and a driving-pulley. Fig. 2 is a plan with all the arms and blades removed, except four, but representing the positions by holes in the beater-shaft. Fig. 3 is an edge view of one of the blades. Fig. 4 is a side view of the same.

Pin-beaters and beaters with arms placed spirally around the beater-shaft have long been used for cotton-openers, and they are usually made tapering, decreasing in size as they recede from the axis of the beater, so that they are smallest at the part farthest from axis; but with my overlapping blades there is much more beating-surface than with pins, and more than with long blades. The beaters most commonly used in cotton pickers and lappers are made with two or three long blades to each beater, each blade being about the same length as the fluted part of the feed-rolls, and parallel with the feed-rolls and beater-shaft, so that as the revolving blades come in contact with the cotton feeding between the rolls they strike along the whole line of the blade at once, often snatching in bunches of the fibrous material, and giving a shock which performs no useful purpose, but causes the machine to drive hard, and wears the bearings and belts more than my improved beater. By placing the blades D angling, still greater steadiness will result.

I will now describe the construction and operation of my improved beater: A is the pulley by which it is driven. B is the beater-shaft, having bearings at *b b*. Holes for the insertion of the beater-arms are shown at *h*, &c. C, Fig. 2, show beater-arms with the small blades D in them. This beater represents twenty-four of them, but there may be more or less. D, Figs. 3 and 4, shows the small blades of the size used in an ordinary picker. They may be of steel, tempered at the tips, or iron, case-hardened, and so wide that each blade will overlap the path of its predecessor. The blades D are shown as placed in cuts made in the ends of the arms C, and secured by rivets or screws at *i i*, and two arms, C C, are made of one piece passing through the beater-shaft; but they may be made of malleable iron, or wrought-iron, or steel, and the small blades can be easily removed when worn away by coming swiftly in contact with the cotton. To prevent the rigidity of blows upon the fiber, rubber or other elastic material might be put under the blade-pieces.

By testing a beater on a picker in a cotton-mill, three times as much cotton was run through as could be of same kind of cotton through the same picker with a two-bladed beater of the kind in common use, and of the same diameter.

Having described the construction and operation of my invention, what I claim is—

The picker-beater herein described, having arms placed spirally around the shaft, two arms being made in one piece, and provided at the ends with removable beaters or blades, each wide enough to overlap the path of its predecessor, and all substantially as and for the purposes specified.

GUSTAVUS E. TAFT.

Witnesses:
DAVID B. CHASE,
HENRY B. OSGOOD.